United States Patent [19]

Cheng et al.

[11] 4,328,199

[45] May 4, 1982

[54] METHOD FOR PRODUCING CARBON BLACK

[75] Inventors: Paul J. Cheng; King L. Mills, both of Bartlesville, Okla.

[73] Assignee: Phillips Petroleum Company, Bartlesville, Okla.

[21] Appl. No.: 186,794

[22] Filed: Sep. 12, 1980

[51] Int. Cl.$^3$ .......................... C01B 31/02; C09C 1/48
[52] U.S. Cl. ..................................... 423/450; 423/449
[58] Field of Search .............. 423/449, 450, 455, 456; 422/150, 62; 23/230 A

[56] References Cited

U.S. PATENT DOCUMENTS

| | | | |
|---|---|---|---|
| 2,659,663 | 11/1952 | Heller | 23/209.4 |
| 2,809,098 | 10/1957 | Larson | 253/209.4 |
| 2,864,673 | 12/1958 | Nannini | 23/259.5 |
| 3,011,872 | 12/1961 | Webster | 23/209.4 |
| 3,650,475 | 3/1972 | Stubblefield | 239/419.3 |
| 3,923,465 | 12/1975 | Krejci | 23/259.5 |
| 4,247,530 | 1/1981 | Cheng | 423/450 |

OTHER PUBLICATIONS

Spraying Systems Co. Bulletin No. 135.

*Primary Examiner*—O. R. Vertiz
*Assistant Examiner*—Gregory A. Heller

[57] ABSTRACT

Carbon black reactors have dual fluid injectors whereby liquid hydrocarbonaceous feedstock atomized by discharging the feedstock through a dual fluid injector with an atomizing fluid. A method for cleaning coke deposits from such dual fluid injectors comprises interrupting the supply of atomizing fluid thereto a cleaning interval effective to remove the coke deposits.

11 Claims, 3 Drawing Figures

METHOD FOR PRODUCING CARBON BLACK

This invention relates to carbon black furnaces. In another aspect, the invention relates to an improved process for the manufacture of carbon black. In yet another aspect, it relates to a dual fluid injector used for the inlet to carbon black furnaces. In a further aspect, it relates to a method for cleaning coke from such a dual fluid injector without interrupting production.

Carbon blacks are a group of intensely black submicron size pigments, composed of essentially pure carbon and made by decomposition of hydrocarbons in an open diffusion flame, in a partial combustion chamber, or in a thermal decomposition chamber in absence of air. Carbon blacks are used as pigments, filtration aids, reinforcing agents for rubbers and the like, and for many other uses. The most important contemporary method of commercial carbon black production is the so-called oil furnace process which involves partial combustion of atomized or vaporized hydrocarbonaceous feed or "make" hydrocarbon, with natural, refinery, or coke oven gas as auxiliary fuels, or with liquid fuels, and with air as an oxygen source producing hot combustion gases, or with preheated air or oxygen-containing gases absent added fuels, in a refractory enclosure or furnace. Such furnaces are shown, for example, in U.S. Pat. Nos. 2,564,700; 2,375,795; and 3,560,164.

In such furnaces as used in the manufacture of oil furnace carbon blacks of, for example, the ASTM N100 to N900 series, the feed oil or make hydrocarbon can be charged to the carbon black reactor by means of dual fluid injectors, for example, bifluid nozzles, with an atomizing fluid, such as, for example, air, steam, or other gases. The two fluids, make oil and atomizing fluid, are charged to the nozzle simultaneously to effect atomization of the make oil which is then charged to the inlet portion of the combustion chamber or zone of the carbon black reactor. Such combustion chambers or zones can have a vortex portion wherein tangential gases, for example, preheated air or hot combustion gases resulting from combustion of a fuel in air, are added, preferably tangentially, to effect a vortex flow of gases. Characteristics of the vortex flow can influence the characteristics of the produced carbon black. Downstream of the combustion chamber or zone relative to the inlet portion thereof, such carbon black reactors can comprise an after-reaction zone or chamber, a quenching zone or chamber, and an after-quench zone or chamber.

In the manufacture of carbon blacks, problems due to "coking" occur. In the manufacture of furnace carbon blacks, one such problem is that the bifluid nozzle of conventional structure which is used to inject the make hydrocarbon and atomizing fluid into the combustion or precombustion chamber or zone can become encrusted with coke. The process of the conventional atomizing nozzle is typically such that atomizing fluid and make hydrocarbon exit the nozzle through the same orifice. When coking develops at the tip or orifice locus, the primary effect can be reduction of air rate and a deterioration of atomization. Feed rate of the oil may not be influenced because frequently a constant feed rate pump is employed for oil feed. The deterioration of atomization can change the characteristics of the carbon black produced, and can impair the quality of the carbon black produced. In order to restore the normal atomization rate, it has heretofore been a practice to take the furnace off production and after removal of the nozzle from the reactor if necessary, to mechanically remove the coke from the nozzle, or to replace the nozzle tip. This procedure is expensive and can necessitate extensive down time of the carbon black producing reactor with resulting loss of production and variation in the quality of carbon black produced.

Accordingly, an object of the present invention is an improved method of carbon black production wherein quality of carbon black produced is maintained. Another object of the present invention is a method whereby coke deposits on dual fluid injectors can be removed. Another object of the instant invention is such a method which does not necessitate interruption of carbon black production. Other objects and advantages of the instant invention will become apparent to those skilled in the art from the following detailed description taken in connection with the accompanying drawings wherein are set forth by way of illustration and example certain embodiments of this invention.

According to the invention is method and apparatus for continuing the flow of make hydrocarbon but at least momentarily discontinuing the flow of the atomizing fluid through the nozzle to effectively remove coke from the nozzle and restore atomization rates and thereby maintain the quality of the produced carbon black. It is speculated that the removal of the coke is a result of the combined effect of scrubbing, due to the high momentum of the liquid make hydrocarbon, and dissolving between the coke solid phase and the make hydrocarbon liquid phase. However, this theory or any theory whereby the present invention can be explained in retrospect is not essential to and does not limit the working of the invention as hereinafter described and claimed. It has further been observed that cut-off or discontinuing the flow of the make hydrocarbon (with atomizing gas flow continuing) does not accomplish removal of the coke in the system herein described. It is speculated that this poor coke removal result is obtained because, firstly, air and/or steam has a poor scrubbing effect and practically no dissolving effect; and secondly, because of the limited cooling effect of air and/or steam, the nozzle tip or orifice locus can be further heated causing coking to propagate more deeply into the nozzle and into the make oil conduit itself. It has been further determined that make hydrocarbon cannot be the fluid whose flow is interrupted for the further reason that the "film" of make hydrocarbon remaining in the nozzle can itself coke due to the high temperatures in the combustion chamber, thereby further reducing the flow of atomizing fluid therethrough.

Further according to the invention is control method and apparatus for practicing the invention.

Although the invention is set out hereinafter in accordance with preferred embodiments thereof, it is not intended to limit the invention thereto but to every embodiment consistent with the disclosure and the claims.

Figure 1:
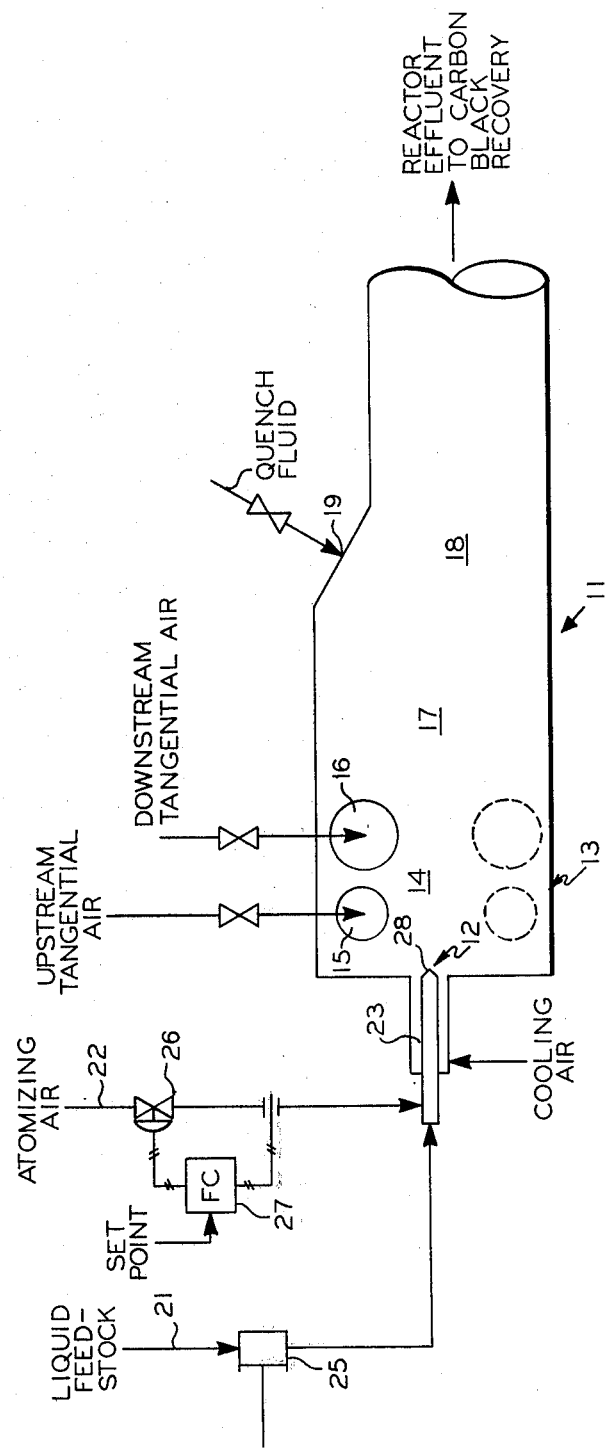
FIG. 1 is a schematic view of a carbon black producing apparatus according to the invention.

Referring now to the drawings in detail, FIG. 1 is a schematic view of a carbon black producing apparatus 11 which can employ the instant invention. The carbon black producing apparatus comprises in axial contiguity an inlet zone or portion 12, a combustion zone 13 having a vortex portion 14 and a reaction portion 17 with tangential fluid input ports 15 and 16 respectively followed by a quenching zone 18 with one or more quenching inlet ports 19.

Make hydrocarbon and atomizing fluid are introduced into the inlet zone or portion 12 by way of a first conduit 21 and a second conduit 22, respectively, which are connected in fluid flow with a bifluid nozzle 23 as shown in FIG. 1. A bifluid nozzle 23 and associated conduits 21 and 22 are better seen in FIG. 2. The hydrocarbonaceous feed oil or make oil liquid is charged to the inlet portion or zone 12 of the carbon black producing apparatus 11 by way of first conduit 21 and bifluid nozzle 23. The atomizing fluid, for example steam and/or air, is charged to the nozzle 23 by way of second conduit 22. The nozzle effects atomization of the liquid feed oil which is charged to the vortex portion 14 of the combustion zone 13 of the carbon black reactor 11. Tangential gas, for example, pre-heated upstream air is charged to the vortex portion 14 by way of tangential fluid inlet ports 15 and, for example, secondary air, via inlet port 16. Tangential gases introduced via 15 are used to effect a vortex flow in vortex portion 14. Downstream gases, for example, air 16 can also be added tangentially. Cooling air can be added around the nozzle to avoid heat damage to the nozzle.

The make hydrocarbon and atomizing fluid are charged to the inlet zone by way of a common nozzle chamber 24 and exit via nozzle tip orifice 28 which during the carbon black production operation can become "coked" thereby decreasing the flow therethrough. In the illustrated embodiment, make oil feed rate is not affected thereby because in the illustrated embodiment a constant feed rate pump 25 is employed. Thus when coking develops at the nozzle tip orifice 28 (see FIG. 2) of the nozzle 23, the effect is a reduction of atomizing fluid feed rate and a deterioration or diminishment of atomization.

Figure 2:
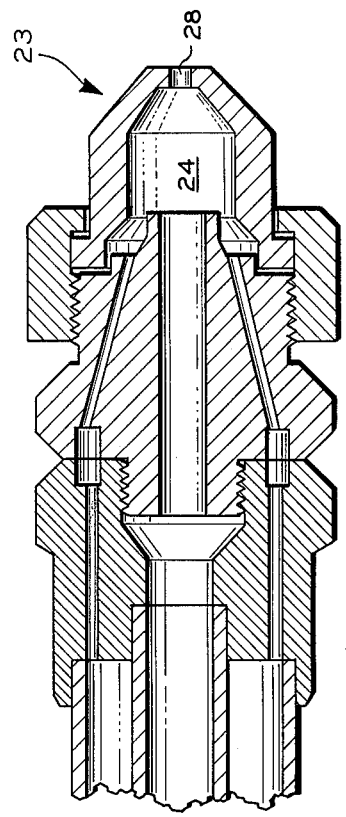
FIG. 2 is a view of a bifluid nozzle of conventional construction which can be employed with the invention.
Figure 2:
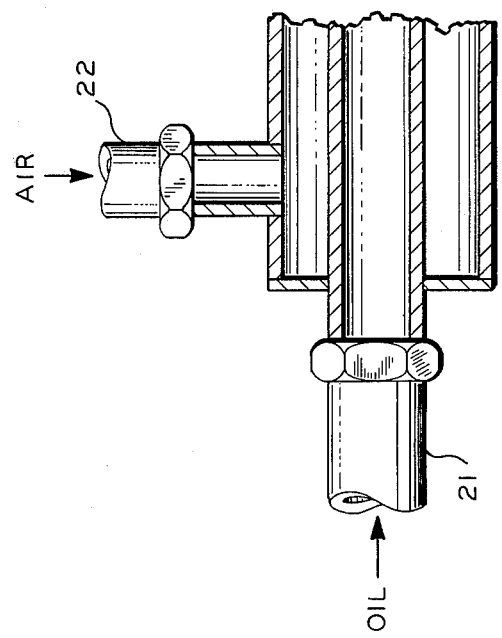

FIG. 2 illustrates a typical bifluid nozzle 23 which can be used in the invention. Liquid hydrocarbonaceous material or oil feed liquid enters the nozzle assembly by way of conduit 21. Air and/or steam, or other atomizing fluid, enters the nozzle assembly by way of conduit 22. The oil feed liquid and atomizing fluid are admixed in common nozzle zone or chamber 24, and the atomized mass exits chamber or zone 24 from the nozzle tip orifice 28.

In a preferred embodiment of the invention, referring again to FIGS. 1 and 2, the atomizing fluid conduit means 22 has a valve 26. Valve 26 can be a valve such as is known in the art whereby the flow of atomizing fluid through conduit means 22 can be selectively interrupted while the flow of make hydrocarbon continues through nozzle 23. The valve is preferably of a type which completely interrupts the flow of atomizing fluid therethrough. In another preferred embodiment, valve 26 is of a type permitting at least 90% reduction of atomizing fluid therethrough during the cleaning interval. This atomizing gas flow can be hand controlled; however, in the illustrated embodiment, flow control means 27 can be used.

According to a preferred embodiment of the invention, the cleaning interval can range from about two to about 20 seconds in duration (longer times not generally being necessary although longer times can of course be used) when coking of nozzle tip orifice 28 has occurred resulting in decreasing the rate of flow of atomizing fluid to a rate whereby insufficient atomization of the oil is effected, and whereby off-specification carbon black can be produced. In a preferred embodiment, the atomizing gas or air is stopped (or is reduced by about at least 90 percent of the original flow) when the original (coke-free) flow of atomizing gas or air has been reduced, due to coking in the nozzle, by at least about 10 percent.

Figure 3:
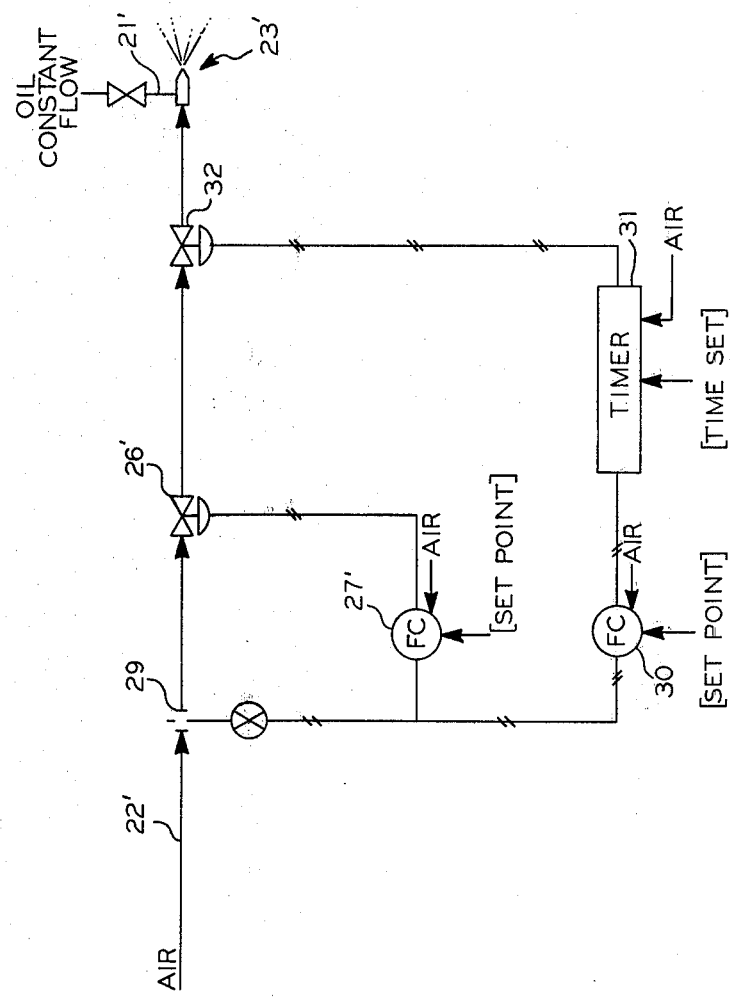
FIG. 3 is a diagrammatic illustration of a control system which can be used with the invention.

Further according to the invention is control method and apparatus for practicing the invention. As illustrated in FIG. 3, the control can be automatically effected. In FIG. 3, second conduit means 22' comprises flow measuring means 29 for detecting the rate of flow of atomizing fluid in second conduit means 22' and for generating a signal representative of the rate of flow of atomizing fluid in the second conduit means 22'. Second conduit means 22' further comprises valve 26' and valve 32 connected in flow communication with the atomizing fluid stream and operable for controlling the flow of atomizing fluid in second conduit means 22'. The signal from flow measuring means 29 is provided to each of first flow controller means 27' and second flow controller means 30. Flow controller means 27' is functional for comparing the signal from flow measuring means 29 to a first reference signal or set point signal which is representative of a desired atomizing fluid flow rate and for generating a first control signal, representative of the difference between the reference signal and the signal from flow measuring means 29, for controlling valve 26'. Flow controller means 27' is operable for selectively opening valve 26 responsive to a detected condition that the atomizing flow rate is more or less than the desired flow rate represented by the first reference signal so as to maintain the atomizing fluid flow rate at the desired rate. Make hydrocarbon is charged at a constant flow rate to bifluid nozzle 23'. As coking occurs in nozzle 23', the atomizing fluid flow rate decreases resulting in first flow controller means 27' generating a signal further opening valve 26' to maintain atomizing fluid flow rate at the desired rate. As coking of nozzle 23' proceeds, valve 26' is further opened until valve 26' is fully opened. Further coking of nozzle 23' can then result in decreases in flow rate which cannot be compensated for by control of valve 26'.

The flow controller means 30 is operable for comparing the first signal representative of atomizing fluid flow rate from flow measuring means 29 with a second reference signal or set point signal representative of a minimum permissible atomizing fluid flow rate, for example, in the preferred embodiment 90 percent of the flow rate represented by the first reference signal. Flow controller means 30 is further operable for generating a second control signal responsive to the detected condition that the atomizing fluid flow rate is less than, for example, 90 percent of the flow rate represented by the first reference signal. The second control signal actuates timer 31 which is set to close valve 32, normally open, for a preselected interval to interrupt flow of atomizing fluid to effect removal of at least a portion of coke from nozzle 23'. Preferably the timer is set to control valve 32 to interrupt flow of atomizing fluid for an interval in the range of about 2 to about 20 seconds, although longer periods can be used. More preferably the timer is set to interrupt flow of atomizing fluid for a period in the range of about 4 to about 15 seconds since interruption of atomizing fluid for an interval in this range can substantially restore atomizing fluid flow to the clean nozzle rates.

Preferably valve 32 is completely closed by the second control signal from flow controller means 30. However, substantial removal of coke can be effected even if the valve is only 90 percent or even less closed.

During the intervals when valve 32 is closed or substantially closed oil continues to flow via first conduit means 21' through nozzle 23' to remove at least a portion of coke deposits from the nozzle. After the preselected interval has elapsed, valve 32 is again open and the atomizing fluid flow rate is again under control of flow controller means 27' and valve 26' at the set point rate of controller 27'.

Alternative methods and apparatuses for practicing the invention can also be used. For example, if a separate air blower is used in lieu of a valve to control atomizing air flow, the second control signal can be utilized to control the atomizing air blower. Other applications of the invention will also be apparent to one skilled in the art from the disclosure and the claims.

In order to further illustrate the instant invention the following example is provided from an actual pilot plant test run producing ASTM N110 type carbon black.

EXAMPLE I

A bifluid nozzle 40100 (fluid cap) and 1401110 (air cap) atomizing nozzle available from Spraying Systems Co., 3201 Randolph Street, Bellwood, Illinois, 60104 was used in a carbon black reactor of the type illustrated in U.S. Pat. No. 2,564,700. CTAB was determined in accordance with J. Janzen & G. Kraus in *Rubber Chemistry and Technology* 44:1287 (1971); CTAB can also be measured by the ASTM procedure D 3765-79.

|  | (1) Original with Clean Nozzle | (2) After 4 Hrs. Operation | (3) After 10 Second Cutting Off Atomizing Air and Cutting Back In |
|---|---|---|---|
| Tangential Air: | | | |
| SCF/hr | 6,000 | 6,000 | 6,000 |
| Temperature, °F. | 68 | 68 | 68 |
| Tantential Fuel: | | | |
| (Propane) | | | |
| SCF/hr | 170 | 170 | 170 |
| Temperature, °F. | 87 | 87 | 87 |
| Axial Feed Oil: | | | |
| Pounds/hr | 60 | 60 | 60 |
| Temperature, °F. | 335 | 335 | 335 |
| BMCI | 125 | 125 | 125 |
| Midboiling Point, °F. | 754 | 754 | 754 |
| API @ 60/60° F. | 0 | 0 | 0 |
| Atomizing Air: | | | |
| SCF/hr | 530 | 460 | 530 |
| Temperature, °F. | 74 | 77 | 74 |
| Pressure, psia | 107 | 107 | 107 |
| Carbon Black: | | | |
| Pounds/hr | 26.3 | 26.9 | 26.3 |
| CTAB, $m^2/gm$ | 127 | 122 | 127 |
| ASTM Type | N 110 | N 110 | N 110 |

As indicated in Example I, after 4 hours of actual operation, the atomizing fluid rate had dropped to approximately 87% of clean nozzle conditions. It is pointed out that the CTAB value during low atomizing gas flow dropped from 127 to 122 $m^2/gm$ (larger nodule), thus indicating change in carbon black nodule size due to changes in atomization. "Nodule" as used herein is the basic unit of the carbon black aggregate, normally generally spherical in shape. As nodule size increases, CTAB decreases because total surface area decreases for a standard weight of sample. Atomizing fluid flow was stopped for a period of 10 seconds. After stopping atomizing fluid flow for 10 seconds and cutting atomizing fluid back in, CTAB returned to 127 $m^2/gm$. It is apparent that a cleaning interval of 10 seconds in accordance with the present invention restored the atomizing air feed rate to the rate observed at clean nozzle conditions and further restored carbon black nodule size to that observed at clean nozzle conditions.

EXAMPLE II

Example II is a calculated run based on actual run data of Example I. Example II is a carbon black operation for producing the so-called "soft" blacks, such as, for example, ASTM N550 carbon black. Refer to FIG. 1 for numerals used.

| | |
|---|---|
| (21) Feedstock, gallons/hr, | 375 |
| BMCI | 128 |
| °API @60/60° F. | −1.2 |
| Midboiling Point, °F. | 750 |
| Preheat Temperature, °F. | 175 |
| Pressure, psig | 70 |
| Nozzle, Peabody Type | |
| Spray Angle, degrees | 40 |
| Number of Outlet Orifices | 8 |
| Diameter Each Orifice, inches | 0.19 |
| (22) Atomizing Air, SCF/hr | 4,000 |
| Temperature, °F. | 150 |
| Pressure, psig | 100 |
| (28) Jacket Air (Cooling Air), SCF/hr | 8,500 |
| Temperature, °F. | 150 |
| Pressure, psig | 100 |
| (15) Upstream Tangential Air, SCF/hr | 46,700 |
| Temperature, °F. | 660 |
| Pressure, psig | 6 |
| (16) Downstream Tangential Air, SCF/hr | 93,300 |
| Temperature, °F. | 660 |
| Pressure psig | 6 |
| (19) Water Quench, pounds/hr | 3,960 |
| Temperature, °F. | 90 |
| Zone 17 | |
| Diameter, inches | 24 |
| Length to Quench 19, inches | 220 |
| Diameter inlet 15, inches | 4.5 |
| Diameter inlet 16, inches | 5.5 |
| Zone 18 (small diameter) | |
| Diameter, inches | 15 |

This calculated Example II is based on actual test data from Example I and is calculated for a commercial size plant operation.

The clean nozzle atomizing air rate will be 4,000 SCF/hour. After about 4 hours operation of the carbon black reactor, the atomizing air rate will have decreased to about 3000 SCF/hour due to coke deposits in the nozzle. At this time (low atomizing air flow) the atomizing air flow is cut out completely for about 10 seconds and then is cut back on stream. While the atomizing air is cut out, the liquid oil, still flowing at a constant rate, of 375 gallons an hour will clean the nozzle of coke deposits. Upon starting up the flow of atomizing air after the cut out of atomizing air, the atomizing air rate will be 4000 SCF/hr, insuring proper atomizing of the liquid oil feedstock so that specification carbon black will be produced, and so as to minimize production of carbonaceous grit which can result from poor atomization of the oil.

While the present invention has been illustrated by reference to a preferred embodiment thereof and exemplified by working and illustrative examples, it is understood that the invention is not limited thereby, but by the claims appended hereto.

We claim:

1. In a method wherein make hydrocarbon and atomizing fluid are supplied to an atomizing bifluid nozzle and the make hydrocarbon is atomized by discharging the make hydrocarbon and atomizing fluid through the atomizing bifluid nozzle, and wherein the atomizing bifluid nozzle becomes coked thereby diminishing the flow rate of at least one of the make hydrocarbon and the atomizing fluid, the improvement comprising:

interrupting flow of the atomizing fluid to effect cleaning of the atomizing bifluid nozzle.

2. A method as in claim 1 wherein:

the flow of atomizing fluid is interrupted for an interval in the range of about 2 to about 20 seconds.

3. A method as in claim 1 wherein:

the flow of atomizing fluid is interrupted for an interval in the range of about 4 and about 15 seconds.

4. A method as in claim 1 wherein:

the flow of atomizing fluid is interrupted for an interval effective to clean at least a portion of coke from the atomizing bifluid nozzle.

5. A method as in claim 1 wherein:

the make hydrocarbon is supplied to the atomizing bifluid nozzle at a constant range; the atomizing fluid comprises air and the flow of atomizing fluid is interrupted when the flow of atomizing air decreases to below about 90 percent of the flow under clean nozzle conditions.

6. A method as in claim 1 wherein:

the make hydrocarbon is supplied to the atomizing bifluid nozzle at a constant rate; and further comprising:

detecting the flow rate of atomizing fluid;

generating a first signal representative of the flow rate of the atomizing fluid;

comparing the first signal to a preselected first reference signal to produce a first difference signal representative of the difference between the first signal and the preselected first reference signal; and controlling the flow rate of the atomizing fluid in response to the first difference signal.

7. A method as in claim 6 further comprising:

detecting a condition that the flow rate of atomizing fluid is less than about 90 percent of the flow rate of atomizing fluid under clean nozzle conditions; and interrupting the flow of atomizing fluid in response to the thus detected condition.

8. A method as in claim 7 wherein:

the flow of atomizing fluid is interrupted for an interval effective to remove at least a portion of coke from the bifluid atomizing nozzle.

9. A method as in claim 7 wherein:

the flow of atomizing fluid is interrupted for an interval in the range of about 2 to about 20 seconds.

10. A method as in claim 7 wherein:

the flow of atomizing fluid is interrupted for an interval in the range of about 4 to about 15 seconds.

11. A method as in claim 1 wherein a carbon black of the ASTM N100 to ASTM N900 series is produced from the make hydrocarbon supplied to the atomizing bifluid nozzle.

* * * * *